(12) United States Patent
Liang et al.

(10) Patent No.: US 10,927,530 B2
(45) Date of Patent: Feb. 23, 2021

(54) WATER SAVING DEVICE

(71) Applicant: Runner (Xiamen) Corp., Xiamen (CN)

(72) Inventors: You-Yu Liang, Xiamen (CN); Can-Kun Wu, Xiamen (CN); Kai Li, Xiamen (CN); Sheng-Chao Dai, Xiamen (CN)

(73) Assignee: RUNNER (XIAMEN) CORP., Xiamen (CN)

( * ) Notice: Subject to any disclaimer, the term of this patent is extended or adjusted under 35 U.S.C. 154(b) by 15 days.

(21) Appl. No.: 16/506,769

(22) Filed: Jul. 9, 2019

(65) Prior Publication Data
US 2020/0048876 A1    Feb. 13, 2020

(30) Foreign Application Priority Data

Aug. 9, 2018 (CN) .......................... 201821280151.7

(51) Int. Cl.
*F16L 55/027* (2006.01)
*E03C 1/02* (2006.01)

(52) U.S. Cl.
CPC .......... *E03C 1/02* (2013.01); *E03C 2001/026* (2013.01); *F16L 55/027* (2013.01)

(58) Field of Classification Search
CPC ... G05D 7/012; F16K 1/465; Y10T 137/7861; Y10T 137/7896; Y10T 137/7792
USPC .... 138/45, 46; 137/515.7, 517, 516.15, 860; 251/900
See application file for complete search history.

(56) References Cited

U.S. PATENT DOCUMENTS

| | | | | |
|---|---|---|---|---|
| 3,216,451 A * | 11/1965 | Smallpeice | ............ | G05D 7/012 137/861 |
| 3,847,178 A * | 11/1974 | Keppel | .................. | F16K 1/465 137/515.7 |
| 6,571,831 B1 * | 6/2003 | Hart | ....................... | G05D 7/012 138/45 |
| 8,985,142 B2 * | 3/2015 | Wildfang | ............... | G05D 7/012 137/515.7 |
| 2003/0209278 A1 * | 11/2003 | Sochtig | .................. | G05D 7/012 138/43 |
| 2014/0110005 A1 * | 4/2014 | Ho | ......................... | G05D 7/012 138/43 |
| 2014/0332097 A1 * | 11/2014 | Twitchett | ............... | G05D 7/012 137/504 |
| 2017/0218609 A1 * | 8/2017 | Lin | ........................ | G05D 7/012 |
| 2018/0036748 A1 * | 2/2018 | Twitchett | ............. | B05B 1/3006 |

* cited by examiner

*Primary Examiner* — Patrick F Brinson
(74) *Attorney, Agent, or Firm* — Chun-Ming Shih; HDLS IPR Services

(57) ABSTRACT

A water saving device is disclosed, which comprises a base having a water flow channel, a throttle ring and a support seat made of an elastic material, and a capacity space is formed in the base, and the support seat is disposed in the capacity space. An annular channel is formed between the support seat and the base. The water channel is in communication with the annular channel. The throttle ring is disposed in the annular channel. When the water pressure is increased to a certain extent, the throttle ring is deformed, and the cross-sectional area of the water flow channel is reduced. The water saving device can effectively prevent the throttle ring from shifting or falling off, and it also has good structural strength and stability that is not easily deformed or broken by external force.

9 Claims, 3 Drawing Sheets

WATER SAVING DEVICE

BACKGROUND OF THE INVENTION

Field of the Invention

The present invention relates to a water related device, and in particular to a water saving device.

The Prior Arts

Water shortage is an important issue of global concern, therefore, water conservation in daily life is an environmental issue that needs to be encouraged and promoted. However, the water saving device in the existing market has a problem that the elastic deformation ring inside the water saving device-tends to be easily washed away by water flow or gas flow. In addition, some parts within the water saving device are weak and can be easily crushed or deformed during installation.

SUMMARY OF THE INVENTION

In view of the problems and drawbacks of the prior art, the present invention provides a water saving device.

To achieve the above objective, the technical means of the present invention is that a water saving device, which comprises a base having a water flow channel, a throttle ring and a support seat made of an elastic material, and a capacity space is formed in the base, and the support seat is disposed in the capacity space. The annular channel is formed between the support seat and the base. The water channel is in communication with the annular channel. The throttle ring is disposed in the annular channel. When the water pressure is increased to a certain extent, the throttle ring is deformed, and the cross-sectional area of the water flow channel is reduced.

Preferably, a groove is disposed in a middle portion of the support seat.

Preferably, the support seat is of a circular shape.

Preferably, the support seat includes a body and an extension portion, and the extension portion has an oblique angle relative to an outer circumference of the body.

Preferably, the oblique angle is an obtuse angle.

Preferably, an annular boss is disposed in the seat relative to the position of the throttle ring.

Preferably, a plurality of concave-convex structures are uniformly distributed-around the annular boss.

Preferably, a plurality of support ribs are disposed and spaced apart between the base and the support seat.

Preferably, the support seat is integrally formed with the base.

The water saving device of the present invention can effectively prevent the throttle ring from shifting or falling off, has good structural strength and stability, and is not easily deformed or broken by external force.

BRIEF DESCRIPTION OF THE DRAWINGS

The related drawings in connection with the detailed descriptions of the present invention to be made later are described briefly as follows, in which.

DETAILED DESCRIPTION OF THE PREFERRED EMBODIMENT

The purpose, construction, features, functions and advantages of the present invention can be appreciated and understood more thoroughly through the following detailed descriptions with reference to the attached drawings.

In the following, an embodiment is used to describe the various details of the present invention. However, it does not mean that this embodiment represents all the embodiments of the present invention. Other embodiments can be envisaged by people familiar with this field, and thus they all fall into the scope of the present invention.

Figure 1:
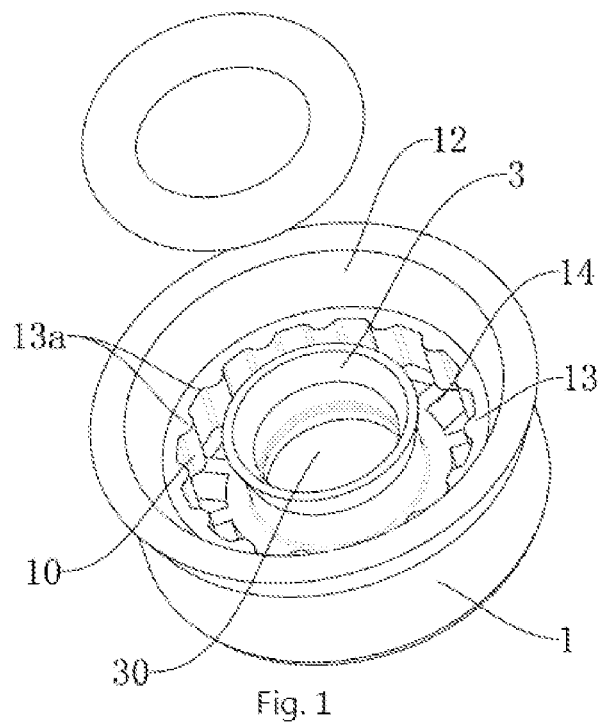
FIG. 1 is a partial perspective view of the present invention.
Figure 2:
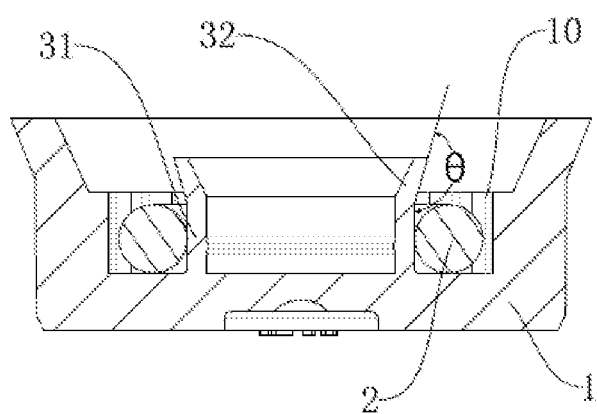
FIG. 2 is a cross-sectional view of the present invention.
Figure 3:
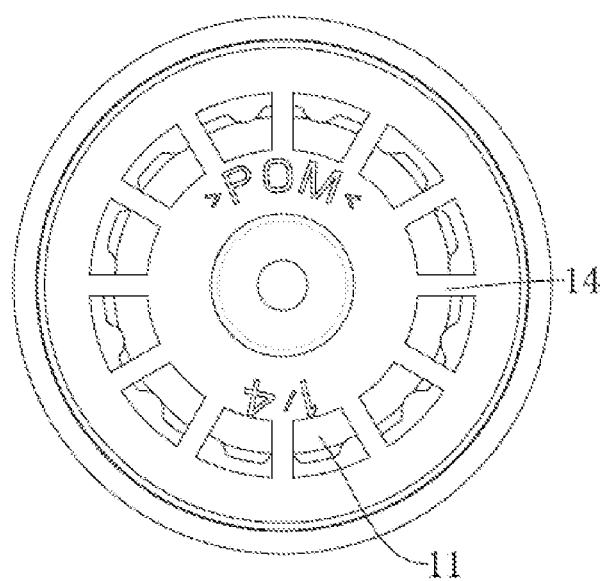
FIG. 3 is a top view of the present invention.

Refer to FIGS. 1 to 3, the present invention discloses a water saving device, which includes a base 1 having a water flow channel 11, and a throttle ring 2 and a support seat 3 made of an elastic material. Preferably, the support seat 3 is integrally formed with the base 1 to enhance the stability of the structure. A capacity space 12 is formed in the base 1, and the support seat 3 is disposed in the capacity space 12. An annular channel 10 is formed between the support seat 3 and the base 1. The water flow channel 11 is in communication with the annular channel 10. Preferably, a groove 30 is disposed in a middle portion of the support seat 3. For example, as shown in FIG. 1, the support seat 3 is of an annular shape, and other shapes having grooves can also be included in the consideration of the present invention. The disposing above makes the throttle ring 2 subject to pressure and deformation to be more balanced, and to have better control of the water volume. More preferably, the support seat 3 includes a body 31 and an extension portion 32 having an inclination angle θ relative to the outer circumference of the body 31. Preferably, the inclination angle θ is an obtuse angle. As a result, the support seat 3 having the groove 30 is combined with the extension portion 32 to form into an inverted structure. The extension portion 32 is a complete molding portion, which can effectively prevent the throttle ring 2 from shifting or falling off, and it also has good structural strength and stability that is not easily deformed or broken by external force. Besides, the throttle ring 2 is disposed in the annular channel 10, and when the water pressure is increased to a certain extent, the throttle ring 2 is deformed, and the cross-sectional area of the water flow channel 11 is reduced. Further, a plurality of support ribs 14 are disposed and spaced apart between the base 1 and the support base 3, and the support ribs 14 may be integrally formed with the base 1 and the support seat 3 to further strengthen the strength and stability of the structure.

Refer to FIG. 1, an annular boss 13 is disposed in the base 1 relative to the throttle ring 2, and a plurality of concave-convex structures 13a are uniformly distributed around the annular boss 13. The deformation of the throttle ring 2 is restricted by the annular boss 13 so that a certain flow amount can be reached. Preferably, the concave-convex structures 13a is a concave-convex structure having rounded corners and it could avoid unnecessary damages to the throttle ring 2 and makes the force of the throttle ring 2 to be more balanced.

The operation principle of the water saving device of the present invention will be described in detail below. When the water pressure is low, the water flows through the water channel 11, and the throttle ring 2 is not deformed, and the water flows normally in the water channel; when the water pressure is gradually increased, the water flow is increased in proportion to the water pressure. However, when the water pressure is increased to a certain extent, the throttle ring 2 is deformed under the water pressure to block part of the water flow channel 11, and the cross-sectional area of the water flow channel 11 is reduced. At this time, the water flow is no longer proportional to the water pressure, but it tends to be steady or have very slight rise or fall, in ultimately achieving the purpose of water saving.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A water saving device, comprising:
 a base having a water flow channel; and
 a throttle ring and a support seat made of an elastic material, wherein a capacity space is formed in the base, the support seat is disposed in the capacity space, an annular channel is formed between the support seat and the base, the water flow channel is in communication with the annular channel, and the throttle ring is disposed in the annular channel, when the water pressure is increased to a certain extent, the throttle ring is deformed automatically, so that the cross-sectional area of the water flow channel is reduced, and
 wherein the base and the support seat are integrally formed as a single piece element.

2. The water saving device as claimed in claim 1, wherein a groove is disposed in a middle portion of the support seat.

3. The water saving device as claimed in claim 1, wherein the support seat is of a circular ring shape.

4. The water saving device as claimed in claim 1, wherein the support seat includes a body and an extension portion, and the extension portion has an oblique angle with respect to an outer circumference of the body.

5. The water saving device as claimed in claim 4, wherein the oblique angle is an obtuse angle.

6. The water saving device as claimed in claim 1, wherein an annular boss is disposed in the seat relative to a position of the throttle ring.

7. The water saving device as claimed in claim 6, wherein a plurality of concave-convex structures are uniformly distributed around the annular boss.

8. The water saving device as claimed in claim 1, wherein a plurality of support ribs are disposed and spaced apart between the base and the support seat.

9. The water saving device as claimed in claim 1, wherein the support seat is integrally formed with the base.

* * * * *